Sept. 5, 1939. P. A. BANCEL Re. 21,193
APPARATUS FOR REFRIGERATING PURPOSES
Original Filed May 17, 1935 2 Sheets-Sheet 1
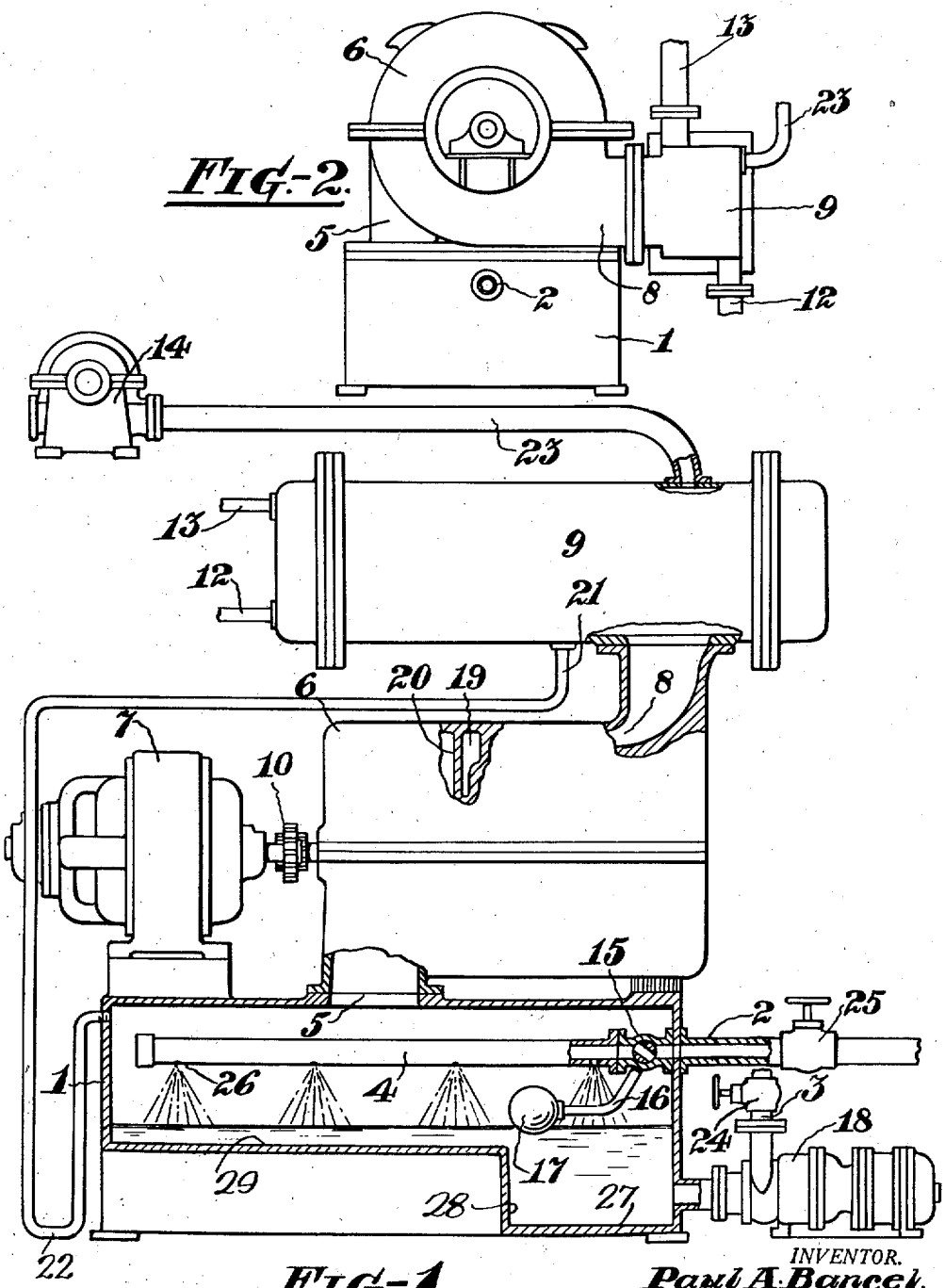
INVENTOR.
Paul A. Bancel.
BY
HIS ATTORNEY

APPARATUS FOR REFRIGERATING PURPOSES

Original Filed May 17, 1935 2 Sheets-Sheet 2

INVENTOR.
Paul A. Bancel.
BY Charles E. Adee
HIS ATTORNEY

Reissued Sept. 5, 1939

Re. 21,193

UNITED STATES PATENT OFFICE 21,193

APPARATUS FOR REFRIGERATING PURPOSES

Paul A. Bancel, Upper Montclair, N. J., assignor to Ingersoll-Rand Company, Jersey City, N. J., a corporation of New Jersey Original No. 2,117,693, dated May 17, 1938, Serial No. 22,003, May 17, 1935. Application for reissue November 26, 1938, Serial No. 242,509

3 Claims. (Cl. 62—152)

Figure 3:
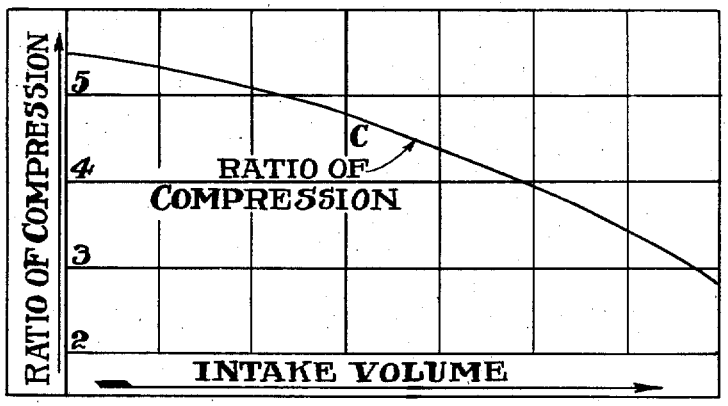

This invention relates to refrigerating apparatus and is particularly concerned with high level refrigeration of the type extensively employed in air conditioning.

In comfort cooling for auditoriums, stores, hotels and other places where people congregate, and also in a great many industrial plants where cool, dry air is important in the satisfactory operation of a process it is not necessary or desirable to provide refrigeration means capable of attaining very low temperatures. Temperatures well above the freezing point of water are sufficiently low to produce the desired results. It is for such and kindred uses that high level refrigeration is employed.

The boiling or evaporation of liquids is the basis of most systems of refrigeration, the nature of the refrigerant and the evaporation pressure determining the temperature attained. The most common refrigerants are gases or volatile liquids, the word volatile describing only those liquids which pass rapidly into a gaseous state at ordinary temperatures and pressures. Because of the relatively high temperature at which water freezes it is manifestly impossible to employ this liquid as a refrigerant where low temperatures are required. In high level refrigeration, however, water has many advantages, not the least of which is its inert chemical character which permits it to be used in direct contact with the substance or article to be cooled, thereby eliminating losses through intermediate stages of heat transfer.

It is an object of this invention to provide water vapor refrigeration equipment which is efficient and economical and which consumes power approximately in proportion to its refrigeration output, the consumption of power being automatically responsive to variations in the load and independent of any regulation external to the basic elements of the system.

Another object is to provide for this purpose apparatus comprising units whose characteristics are so interrelated as to render their coaction stable over a wide range of varying load conditions.

It is an additional object of this invention to provide apparatus for water vapor refrigeration so selected and combined as to have an inherent temperature limitation which may be utilized to prevent freezing of the refrigerant without the interposition of any external control whatever.

A further object is to provide apparatus whereby water vapor refrigeration may be employed without the use of a steam ejector compressor, which, until now, has been the only type of compressor successfully and economically used in water vapor refrigeration. The steam ejector at absolute pressures from .2 inch of mercury to .55 inch of mercury (the range corresponding to water vapor temperatures of from 34.5° F. to 61.5° F.) is for all practical discussion a constant volume compressor. In this respect and the consequent characterics of its operation as an evacuator of water vapor it differs materially from the apparatus to be described herein.

In a water vapor refrigeration cycle consisting of an evaporator, a compressor to induce a vacuum therein and to withdraw and compress the vapors from the water supplied thereto, a condenser to condense the compressed vapors, and a vacuum pump to maintain a vacuum in the condenser, the foregoing objects are attained by the use of a centrifugal compressor as the second unit in the system. To obtain the desired maximum compression ratio in a small number of stages it is desirable to employ a centrifugal compressor equipped with a radial vane type of impeller. For best economy and simplicity of operation the compressor must operate at high peripheral speeds and should be of a multistage constant speed type.

The use of a centrifugal compressor in such a combination has heretofore been considered commercially impractical. It has been an axiom, or at any rate a tenet, among centrifugal refrigeration engineers that the refrigerant employed in connection with a centrifugal compressor must have certain physical characteristics which are conspicuously foreign to the qualities of water.

The theoretically ideal refrigerant for use in the centrifugal compressor system has, in the past, been thought to have been a substance combining high molecular weight or density with a low compression ratio to attain a desired temperature range. Water, with its low molecular weight and high compression ratio for a given range has been thought entirely unsuitable. Furthermore the characteristics of water vapor when superheated have been deemed detrimental to its successful use with a centrifugal compressor.

Wth a properly designed compressor, however, employed in a system whereby the characteristics of water vapor may be used to cooperate with and compensate for the operating characteristics of the compressor it has been found not only practical but economical to employ centrifugal compression in a water vapor cycle of refrigeration.

The invention, though involving the overthrow of a considerable body of engineering dictum, is essentially simple and may be readily understood by anyone familiar with thermodynamic principles.

The contemplated construction also involves novel structural details. Therefore, still another object of the invention is to enable each part of the refrigerating apparatus to aid in the support of the other parts, thereby to produce a compact structure which will occupy as little space as possible.

Yet another object of the invention is to produce efficient vaporization and chilling of the refrigerant in the evaporator while maintaining static head on the pump for delivering refrigerant from the evaporator.

In the accompanying drawings similar reference characters are employed to denote similar parts.

Figure 4:
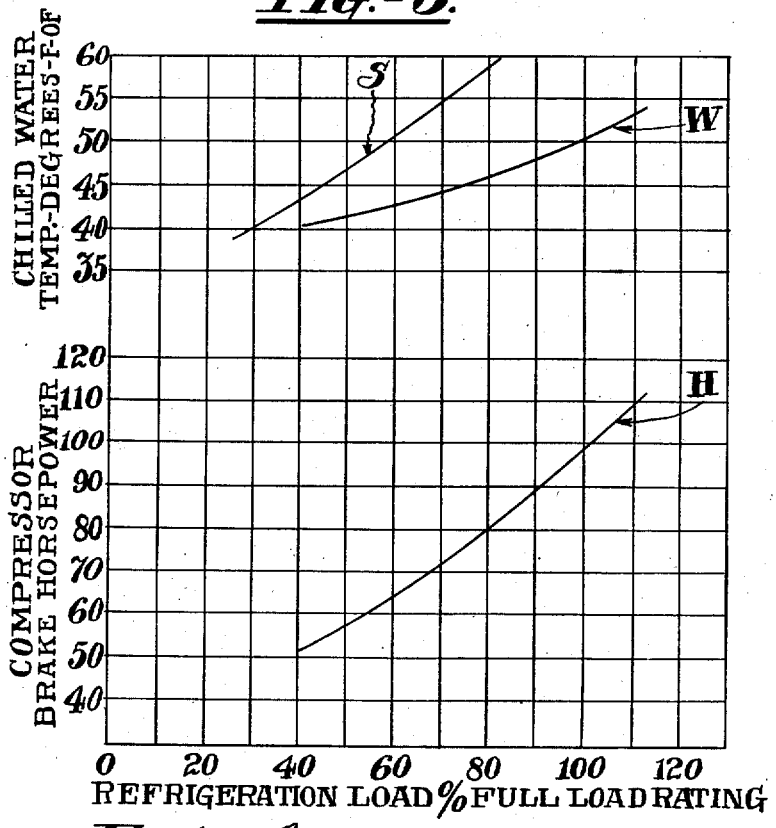

Fig. 1 is an elevation, partly in section, showing the component elements employed in the system, the condenser being shown outside of its correct position (see Figure 2) for the purpose of clarity, Fig. 2 is a view of the same parts arranged compactly and efficiently as a commercial unit, Fig. 3 is a curve illustrating an operating characteristic of the centrifugal compressor, Fig. 4 is a curve illustrating the power characteristic of a centrifugal compressor under varying loads together with a companion curve showing the range of refrigerant temperature under the same load conditions, and a third curve which shows the range of load over which the unit is capable of stable operation.

An evaporator tank 1 is supplied with water by a pipe 2 which delivers to a header 4 extending into the tank and having openings 26 from which the water is sprayed into the tank. A centrifugal compressor 6 is connected to tank 1 by means of an inlet opening 5 whereby the evaporator tank may be placed under a high vacuum and a portion of the spray water from the header 4 be evaporated.

The compressor 6 to be practicable in an installation of this kind should have a very large volumetric capacity. In order to reduce the number of stages of compression required it should be rotated at high peripheral speeds. To reduce the power consumption at starting and the weight of the rotor elements the high peripheral speeds are preferably obtained by rotors of relatively small diameter rotated at a relatively high number of revolutions per minute.

The speed of the compressor may be obtained by any suitable means. The means illustrated comprise a constant speed motor 7 and a step-up gear 10 connected to rotate the compressor at a higher speed than the motor. Suitable compressors for this service may have a practical working compression ratio of approximately 3 to 1 under low back pressures and about 6 to 1 under high back pressures.

In order to maintain low temperatures in the compressor and to reduce superheating of the vapor compressed therein it is important that the walls 20 of the flow passages be arranged to enclose circulating water passages 19 through which cooling water may be circulated by suitable inlet and outlet means (not shown). Other means such as interstage coolers may be substituted if desired.

The importance of providing cooling means in the compressor unit is apparent when we recall that saturated water vapor taken at a pressure of .3 inch of mercury and compressed five times would have a resultant pressure of 1.5 inches of mercury and a temperature of 91.7° F. The superheat imparted to it by the act of compression based upon 55% efficiency in the compressor would increase its temperature by about 400° F. The superheat would cause a tremendous expansion of the vapor and would make necessary extremely large compressor units in all stages of the compressor succeeding the first one. Consequently the desirability of cooling the walls of the compressor to carry off this superheat is evident. It is important, however, that the cooling effect should not be so great as to cause condensation of the vapor, otherwise water particles might do considerable damage to the high speed rotor of the compressor.

It may be remarked in passing that compressors designed for use with gases which do not increase greatly in volume upon the addition of superheat are not in practice provided with cooling means, probably for the reason that condensation in the compressor is too dangerous a possibility to risk.

Ammonia and Freon which are comparable to water vapor in the theoretical consumption of power per ton of refrigeration, but which may be compressed with greater efficiency, suffer relatively slight increases of temperature due to superheat. At a theoretical compression efficiency of 100% in compressing from 35° F. evaporation temperature to 95° F. condensing temperature the superheat of compression for Freon is 10° F., for ammonia 77° F. and for water 270° F.

The foregoing comparison indicates some of the reasons why it has heretofore been believed that water was unsuitable as a refrigerant for use with mechanical compressors, as distinguished from thermo-compressors.

Returning to Fig. 1 a discharge passage 8 leads from the compressor 6 to a condenser 9 wherein the vapors removed from the evaporator 1 and compressed and heated in the compressor 6 are condensed.

The condenser 9 is preferably a surface condenser of the multi-pass type and is provided with suitable inlet and discharge openings 12 and 13 through which cooling water may be circulated. A vacuum is maintained in the condenser 9 by means of an air removal pipe 23 connected to a vacuum pump 14 which may be of any type capable of maintaining a suitable vacuum in the condenser.

The condensate formed by the condensation of the vapor removed from the evaporator is returned through a trap 22 connected to condensate outlet 21 and discharged into the evaporator. The short leg of the trap 22 should be of sufficient length to provide a seal against a pressure difference of about 2 inches of mercury.

The condensate returned to the evaporator as above described is at a temperature considerably higher than the temperature in the evaporator and a portion of it will immediately flash into vapor. The evaporation of this portion will chill the remainder to the temperature of the evaporator. Owing to its high latent heat of evaporation, however, the flashing of a relatively small percentage of water will result in the required cooling effect. A rule of thumb calculation is that evaporation of one per cent of the water will reduce the temperature of the remaining 10° F.

It is interesting to note parenthetically that in this respect ammonia and Freon suffer by comparison as the former must evaporate in excess of 2 per cent per 10° F. and the latter 3.5 per cent for the same effect.

The chilled water in the base of the evaporator 1 is withdrawn by means of a sump 18 which is preferably of a motor driven type and is discharged through a pipe 3 to the apparatus (not shown) in which the heat is absorbed, from which it is returned to the evaporator by means of the return line 2. The pump discharge line 3 is controlled by a valve 24 and the return line 2 is provided with a control valve 25. The level of chilled water in the evaporator is maintained approximately constant by means of a valve 15 controlled by a float 17 acting through a lever arm 16.

In the commercial construction (see Figure 2) the compressor 6 and motor 7 are supported upon the member 1 which forms the evaporator chamber, and the condenser 9 is arranged beside the evaporator and compressor to be supported thereby. The entire construction becomes compact, the space required is small, and each part contributes to the support of the other parts and all parts are supported by the tank member 1.

The tank itself may be of the construction shown in Figure 1. In general, it is of oblong contour and of shallow depth having its bottom in two horizontal sections 27 and 29, with the section 29 above the section 27. A rising partition 28 serves to join the two sections. A very shallow compartment is thus formed above the section 29 wherein most of the vaporization occurs, and the shallowness thereof serves to facilitate such vaporization. The deeper compartment above the section 27 receives the chilled refrigerant from the more shallow section, and the liquid which collects in this deeper section provides a static head upon the pump 18. This deeper section also serves to provide latitude of motion for the float 17, which together with the connection 16 and the valve 15 may be entirely enclosed within the tank 1 to eliminate the need for sealing devices for the said connection 16. In this construction the sections 28 and 29 may constitute a false bottom above the true bottom 27 of the tank 1 in order that the ability of the tank 1 to support the equipment superposed thereon may not be impaired.

As in all vapor or steam apparatus the pressures and temperatures present in any stage are interdependent and neither can change without a corresponding change in the other. In this system the determinate factors are the evaporator and condenser pressures and the compressor characteristic as affected thereby. It is elementary that no matter what type of vacuum pump be employed with a condenser the pressure in the condenser, assuming the presence of vapor therein, can never be less than the pressure corresponding to the outlet temperature of the cooling water. With low temperature cooling water, however, this pressure might be lower than desired, so that the establishment of a minimum pressure limited by the capacity of the vacuum pump may be an additional precaution.

Water vapor is dangerously near the freezing point at .18 inch of mercury and it is essential in order to avoid freezing of the chilled water supply that evaporator pressures of less than .18 in. Hg be made impossible. The designer need not provide any thermostatic or other external devices to safeguard the system from this danger. If he desires the compressor speed and design may be such that its maximum compression ratio is 5 to 1 for example, the vacuum pump and condenser may be of a design incapable of maintaining a pressure lower than .9 inch of mercury absolute in the condenser. With such units it will manifestly be impossible to attain a freezing temperature in the evaporator.

In the system above described the pressure in the condenser is the back pressure or head against which the centrifugal compressor must work. It is especially characteristic of a true centrifugal machine as contrasted with the rotary type, that, at constant speed, the inlet volume is markedly reduced as the back pressure is increased and vice versa. It will be understood, therefore, that the ratio of compression will vary inversely as the inlet volume. This phenomenon is graphically illustrated by the Curve C of Figure 3.

It is characteristic of vapor as the freezing temperature is approached that comparatively small changes in absolute pressure are accompanied by relatively large changes in temperature and tremendously large changes in volume. Thus a pound of water vapor at a pressure of .4 inch of mercury will have a temperature of 52.7° F. and a volume of 1600 cu. ft. If the vacuum is increased by another tenth of an inch to an absolute pressure of .3 inch of mercury the resultant temperature will be 45° F. and the volume will be 2030 cu. ft. At an absolute pressure of .2 inch of mercury the corresponding temperature is 34.6° F. and the specific volume is 2970 cu. ft. It is this very characteristic itself which has hitherto been thought to make impracticable the use of a centrifugal compressor in the water vapor refrigeration cycle.

It is obvious that if it is desired to maintain a vapor temperature of 45° F. in an evaporator a vacuum of .3 inch of mercury must be maintained by the compressor. If the water entering the evaporator is at a temperature approaching that corresponding to the vacuum there will be little evaporation and the amount of vapor formed will probably be less than can be handled by the compressor at the existing ratio of compression. The tendency then would be for the suction pressure to be reduced to a point where sufficient volume of vapor would be formed to satisfy the inlet capacity of the compressor at a new ratio of compression.

If, however, the water entering the evaporator is considerably warmer than the temperature corresponding to the vacuum more of the water will flash into vapor, thereby reducing the temperature of the remaining water. If the volume of vapor thus formed is within the inlet capacity of the compressor under the existing ratio of compression the incoming water will be cooled to the temperature corresponding to the vacuum, but if the volume of vapor thus formed exceeds the capacity of the compressor under the existing ratio of compression the temperature of the water and water vapor in the evaporator will rise and with it the absolute pressure until an equilibrium is attained at a temperature-pressure condition where the volume of vapor formed in the evaporator will be equal to the capacity of the compressor. This is simply the application in the particular system of the laws of equilibrium. The approximate temperatures of the chilled water at different loads, as taken from units in commercial operation is shown by curve W of Fig. 4.

In all ordinary applications the centrifugal compressor operating at constant speed has been found to have a comparatively narrow load range below the limits of which the compressor is subject to "surging". This is particularly true of compressors having impellers of the radial vane type, and it is well known that this type of compressor is unsuited to applications where there is a wide variation in load. In pumping from a high vacuum evaporator, however, into a relatively low vacuum condenser it has been found that the characteristics of water vapor volume and temperature, may be so coordinated with the ratio of compression characteristics of the centrifugal compressor as to materially extend the effective range of the compressor to include any underload conditions likely to occur in commercial installations.

Stability (absence of surging) in the operation of a centrifugal compressor of the radial vane type does not ordinarily exceed a range the lower limits of which are at 65% to 75% of the rated load. The latitude between 65% and 75% is merely reflective of a similar latitude of design and that which may be permitted in rating a given compressor. In refrigerating systems where the temperature of the refrigerant is maintained constant irrespective of load conditions, by control of the back pressure or otherwise, this range of stability may be a limiting factor in the flexibility of the system under existing conditions. In some cases where centrifugal compressors have been used with volatile refrigerants, automatic dampers with a rather delicate and complicated control system have been employed to adjust conditions to maintain them within the range where the compressor is stable.

Where, however, the refrigerant is water and no attempt is made to maintain a constant temperature in the evaporator, the temperature drops at reduced loads. With the drop in temperature, however, there is a great increase in the specific volume of vapor so that the total volume and the conditions making for stability in the operation of the compressor are extended over a much greater range of refrigerating load. Under this method of operation the lower limit of stability has been found to be at about 25% to 40% of the rated load capacity at reduced temperatures. At loads of less than this, which are infrequent in actual practice, "surging" will occur but the vapor handled by the compressor is so attenuated and so reduced in volume that the surging has no ill effects. The curve S of Fig. 4 roughly indicates the lower limits of the range of stable operation (surge point) at different loads and temperatures where the refrigerant temperature is permitted to drop with the load.

As superheat is a function of the ratio of compression and as the ratio of compression increases with reduced temperature at low loads, the expansion of vapor due to superheat in the lower ranges of operation will have a slight tendency to reduce the capacity of the compressor. Far from being a disadvantage under such conditions it is possibly of some benefit as it would have a tendency of moving the range of stable operation to a still lower percentage of the rated load.

This stability in itself is an advantage as it permits the use of centrifugal apparatus for part load use without complicated control mechanism such as is involved in start-stop operation, or without an uneconomical method of artificial loading, or the use of an unpractical complicated auto-controlled suction damper.

There is an additional advantage in the use of a centrifugal compressor as it consumes power only in proportion to its load, so that substantial economies may be effected at reduced loads.

The power consumed by the compressor depends upon the volume, the suction pressure, and the efficiency. As a compressor may be designed with a relatively flat efficiency curve over the range of volumes met with in apparatus as described, the determining factors will be the suction pressure and the vapor volume. The reduction in chilled water temperature at reduced loads is concurrent with reduction in suction pressure, increase in compression ratio, and consequent decrease in the volume handled by the compressor, hence, it follows that power consumption will vary as the load. This characteristic is illustrated by curve H of Figure 4 which closely follows results obtained in actual service of commercial units.

Having described the apparatus and in a measure explained the characteristics of the more important elements and of the refrigerant employed, the mode of operation of the unit and its behavior under different conditions will be taken up.

Ordinarily the unit, just prior to initial operation, will be subject to conditions quite different from those which exist during actual use. The evaporator and condenser will be under the same pressure. The water in the evaporator, having presumably been drawn from the same source as the cooling water for the condenser, will probably be at a temperature much higher than will be encountered under operating conditions.

The presence of a relatively large quantity of air, with the effect of its partial pressure upon the vacuum in the system, is a condition foreign to that existing after operation is begun. Furthermore, for a period when the compressor is getting up to its rated speed, its characteristics will be other than those for which it was designed.

Because of the foregoing circumstances a rather complicated reaction occurs in the system when it is first started up and it is not thought necessary here to analyze in detail the various changes which take place as the unit assumes its initial load and attains equilibrium thereunder. This starting stage of operations is preferably supervised and not left to automatic control.

The first step in placing the system in operation is to start the vacuum pump 14. The compressor 6, in order to economize power as has been explained, is of light construction and the motor 7 is not powerful enough to rotate it at its rated speed in heavy atmospheres. In order to prevent breakdown of the motor 7, therefore, this unit should not be started until the pressure in the system has been reduced to about 2 inches of mercury or less.

When this vacuum has been attained the condenser circulating water pump (not shown) may be started and then the chilled water pump 18 may be started against closed discharge provided by the valve 24. Operation of the motor 7 and the compressor 6 is then begun. Water is now admitted to the evaporator by hand valve 25 and pipe 2.

The float controlled valve 15 limits the entrance of water through the header 4 to the amount necessary to compensate for the loss by evaporation and by removal by the pump 18. The loss by evaporation under normal conditions will seldom exceed one per cent.

As the pump 18 is still working against a closed outlet no water will be removed from the tank 1 except the small quantity taken away as vapor by the compressor. The initial load represented by the heat of the relatively small amount of stagnant water in the evaporator is light and the pressure and temperature in the evaporator is rapidly reduced. At the same time the residual air in the evaporator is compressed and transferred to the condenser whence it is removed by the air pump 14. The partial air pressure in the system is reduced to such a point as to be negligible. Under the conditions set forth the unit will come into equilibrium with a temperature of approximately 35° F. in the evaporator. It is then time to impose a refrigerating load upon the apparatus.

By gradually opening valve 24 the pump 18 starts circulating chilled water and some of the warm water in the system is admitted through the header 4 and chilled by evaporation of a part thereof. This load is abnormal, for in addition to the refrigerating load, comprising the heat transferred to the chilled water at the place where the refrigerating work is performed, there is an additional burden imposed by reason of the original high temperature of the water which has hitherto been standing in the idle circulating system. It is for this reason that the valve 24 controlling the outlet is opened gradually thereby controlling the imposition of this abnormal load. When the abnormal heat has been removed from the chilled water circuit, which, owing to the overload capacity of the compressor, is in a relatively short time, the valve 24 is fully opened and thereafter the unit is entirely self regulated. The temperature of the water returning through pipe 2 is now influenced only by the heat load imposed at the place where the heat transfer is effected. The volume of water entering header 4 is now influenced only by controls which may exist externally of the unit herein disclosed.

Apparatus of this kind is ordinarily designed for a predetermined refrigeration load. A unit may be designed to receive 100 G. P. M. of water at 60° F. and chill it to 50° F. before it is sent back by the pump 18 to the place where heat is absorbed. Under reduced load conditions the quantity of water circulated through the evaporator may be constant and the range of cooling be less than 10° F., or the range of cooling may be maintained at 10° F. and the quantity of water circulated through the evaporator may be reduced, or both the range of cooling and the volume of water may be reduced. These conditions are determined by controls external to the refrigerating apparatus, usually located in the plate where heat is transferred from the chilled water to the substance to be cooled.

If in the apparatus designed to chill 100 gallons per minute from 60° to 50° F. the load is reduced to about half we may have a condition where 70 G. P. M. is chilled 7° F. The quantity of heat to be removed from the water entering the evaporator is now only 490 units (degrees times gallons) as compared with 1000 units at full load. Consequently a smaller quantity of heat is transferred by the compressor to the condenser. The condenser vacuum depends upon the surface area, the quantity and temperature of condensing water, and the heat contained in the entering vapor. When, as here supposed, the heat of the entering vapor is reduced a decrease in condenser pressure must follow at part load. This decrease will temporarily reduce the ratio of compression of the compressor and consequently increase its volumetric capacity.

The increased volume of vapor handled by the compressor will lower the pressure, and consequently the temperature, in the evaporator. With the lowered pressure in the evaporator the ratio of compression of the compressor will increase and its volumetric capacity will decrease. Equilibrium for the new load conditions will be established when the total volume of vapor entering the compressor as determined by the weight of vapor and its specific volume reaches a value such that the ratio of compression developed by the constant speed compressor equals the condenser pressure divided by the evaporator pressure. This equilibrium will be reached under the assumed conditions at a markedly lower chilled water temperature than that existing at full load. The exact temperature will depend upon conditions in the condenser, but with the temperature of the condenser inlet cooling water unchanged the chilled water temperature will invariably be lower at reduced loads than at full load.

When a refrigerating unit as described at part load is subjected to an increased load the unit must find a new point of equilibrium corresponding with the new load conditions. As the water enters the evaporator at increased temperature more heat must be removed and consequently a greater quantity must be vaporized to reduce the temperature of the remainder. The compressor cannot remove this larger quantity of vapor except at a reduced ratio of compression. As the condenser pressure cannot be lowered the pressure in the evaporator must increase. When this occurs the ratio of compression is reduced and the capacity of the compressor increased.

Equilibrium at the increased load will be established with higher pressures in both evaporator and condenser and with a lower compression ratio in the compressor. A higher temperature will, of course, attend the higher pressures.

It will be understood that all changes of load are accompanied by changes of pressure in evaporator and condenser and by changes of ratio of compression and volumetric capacity of the compressor. The three elements must always be in balance, and they automatically adjust themselves in response to load conditions.

The higher temperatures at increased loads which result from the uncontrolled operation of the unit are not of great magnitude. At the higher evaporator pressures the specific density of the vapor increases rapidly, and the evaporation of a given volume of the heavier vapor, has, of course, a greater cooling effect upon the remaining water than the same volume at lower pressures. Thus the increased volumetric capacity of the compressor at higher pressures is accompanied by still greater capacity for heat removal. The converse is true under reduced load conditions. These characteristics, combined with the stability and power saving features of the apparatus result in a fundamentally simple, economical, and extremely flexible refrigerating unit.

I claim:

1. A refrigerating system comprising an evaporator wherein a refrigerant is partially vaporized, means to admit refrigerant to the evaporator, means to remove chilled refrigerant from the evaporator, means enclosed in the evaporator and acting responsively to the refrigerant level in the evaporator to control said admission of refrigerant, a constant speed water cooled centrifugal compressor to induce vaporization of the refrigerant in the evaporator in quantities varying directly with the temperature of the refrigerant admitted and to remove the vapor thus formed, said compressor being constructed and arranged to have a low suction pressure limitation set to prevent freezing of the refrigerant in the evaporator, a condenser to which vapor is delivered, and means including a trap whereby the condensate in the condenser is returned to the evaporator.

2. A refrigerating system comprising an evaporator, a conduit extending into the evaporator for admitting a refrigerant thereto, means for removing chilled refrigerant from the evaporator, a valve in the conduit, a float in the evaporator acting responsively to the refrigerant level in the evaporator, connections whereby said float actuates said valve, said float and valve being enclosed within the evaporator to eliminate sealing devices for said connections, a constant speed water cooled centrifugal compressor to induce vaporization of the refrigerant in the evaporator in quantities varying directly with the temperature of the refrigerant admitted and to remove the vapor thus formed, said compressor being constructed and arranged to have a low suction pressure limitation set to prevent freezing of the refrigerant in the evaporator, a condenser to which said vapor is delivered, means for maintaining a vacuum in the condenser, and means including a trap whereby the condensate from the condenser is returned to the evaporator.

3. A refrigerating system comprising an evaporator wherein a refrigerant is partially vaporized, means to admit refrigerant to the evaporator, means to remove chilled refrigerant from the evaporator, means acting responsively to the refrigerant level in the evaporator to control said admission of refrigerant, a constant speed water cooled centrifugal compressor to induce vaporization of the refrigerant in the evaporator in quantities varying directly with the temperature of the refrigerant admitted and to remove the vapor thus formed, said compressor being constructed and arranged to have a low suction pressure limitation set to prevent freezing of the refrigerant in the evaporator, a condenser to which vapor is delivered, and means including a trap whereby the condensate in the condenser is returned to the evaporator.

PAUL A. BANCEL.